United States Patent [19]
Lin et al.

[11] Patent Number: 6,019,520
[45] Date of Patent: Feb. 1, 2000

[54] PRE-ASSEMBLED OPTICAL FIBER CONNECTOR

[75] Inventors: Samuel I-En Lin, Miao-Li Hsien; Jyh-Cherng Yang, Hsinchu, both of Taiwan

[73] Assignee: Uconn Technology Inc., Taiwan

[21] Appl. No.: 09/150,293

[22] Filed: Sep. 9, 1998

Related U.S. Application Data

[63] Continuation-in-part of application No. 08/992,215, Dec. 17, 1997, abandoned.

[51] Int. Cl.[7] .................................................... G02B 6/36
[52] U.S. Cl. ................................ 385/76; 385/60; 385/78; 385/72
[58] Field of Search ................................ 385/76, 53, 60, 385/62, 72, 78, 81, 88, 138, 139

[56] References Cited

U.S. PATENT DOCUMENTS 5,287,425  2/1994  Chang ........................................ 385/81

*Primary Examiner*—Phan T. H. Palmer
*Attorney, Agent, or Firm*—Michael D. Bednarek; Crowell & Moring LLP

[57] ABSTRACT

A pre-assembled optical fiber connector is provided that comprises a boot, a sleeve, a spacing sleeve, a tubular housing, a spring, an alignment ferrule, a push-pull insulative housing and a push-pull element which are assembled in series. The alignment ferrule has at least one engaging portion to engage the tubular housing so that the tubular housing, the spring and the alignment ferrule are pre-assembled.

5 Claims, 6 Drawing Sheets

PRE-ASSEMBLED OPTICAL FIBER CONNECTOR

CROSS REFERENCE TO RELATED APPLICATIONS

This is a continuation-in-part of co-pending U.S. patent application Ser. No. 08/992,215, filed Dec. 17, 1997 now abandoned.

BACKGROUND OF THE INVENTION

1. Field of the Invention

This invention relates to a pre-assembled optical fiber connector, especially to a pre-assembled optical fiber connector that does not require the use of a specialized clamping apparatus while being ground.

2. Description of the Related Art

A conventional SC type optical fiber connector has many elements. In addition, none of the elements of the SC type optical fiber connector can be assembled in advance. Therefore, storing the elements of the optical fiber connector and assembling the same is complicated.

The SC type optical fiber connector and an optical fiber are assembled for grinding in two ways: (1) The optical fiber is inserted into an alignment ferrule of the optical fiber connector, applied with glue and baked. Then, the alignment ferrule assembled together with the optical fiber is fixed by a clamping apparatus and is ground. Then, the ground alignment ferrule is assembled with other elements of the optical fiber connector such as a tubular housing and a spring. However, assembling the alignment ferrule together with the tubular housing and spring after the alignment ferrule is ground easily damages the optical fiber. (2) Before being ground, the alignment ferrule is assembled with the tubular housing and spring. However, a push-pull insulative housing of the optical fiber connector must also be assembled together with the assembly of the alignment ferrule, the tubular housing and the spring. Then, a specialized clamping apparatus is required to firmly clamp the push-pull insulative housing of the optical fiber connector in the grinding process. Such a clamping apparatus is expensive, and is inconvenient for the worker to operate. Furthermore, the optical fiber may still possibly become damaged in the grinding process.

U.S. Pat. No. 5,287,425 provides an optical fiber SC type connector having pre-assembled elements. That is, some elements of the SC type optical fiber connector can be assembled in advance to simplify the assembly process and element storage. However, the pre-assembled elements include a hollow insulative housing; thus, a specialized clamping apparatus is later required in the grinding process, as in the conventional optical fiber connector mentioned above. Furthermore, the insulative housing rather than the ceramic ferrule of the SC type connector is clamped by the clamping apparatus in the grinding process. As a result, the ceramic ferrule tends to be oblique while being ground and the grinding result is not good.

SUMMARY OF THE INVENTION

An object of the present invention is to provide a pre-assembled optical fiber connector that solves the abovementioned problem.

In accordance with the object of the present invention, a pre-assembled optical fiber connector is provided that comprises a boot, a sleeve, a spacing sleeve, a tubular housing, a spring, an alignment ferrule, a push-pull insulative housing and a push-pull element which are assembled in series. The alignment ferrule has at least one resilient engaging portion to engage the tubular housing so that the tubular housing, the spring and the alignment ferrule are pre-assembled.

The pre-assembled elements do not include the push-pull insulative housing. Therefore, the ceramic ferrule rather than the push-pull insulative housing is clamped when the ceramic ferrule is ground, and there is no need to use a specialized clamping apparatus. Furthermore, in the grinding process, the ceramic ferrule can be kept straight without slanting because the ceramic ferrule is directly clamped by a clamping apparatus. Thus, the grinding results of the present invention are much better than those of the prior art. Furthermore, the tubular housing, the spring and the alignment ferrule are pre-assembled so that the assembly process and element storage of the optical fiber connector can be simplified.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
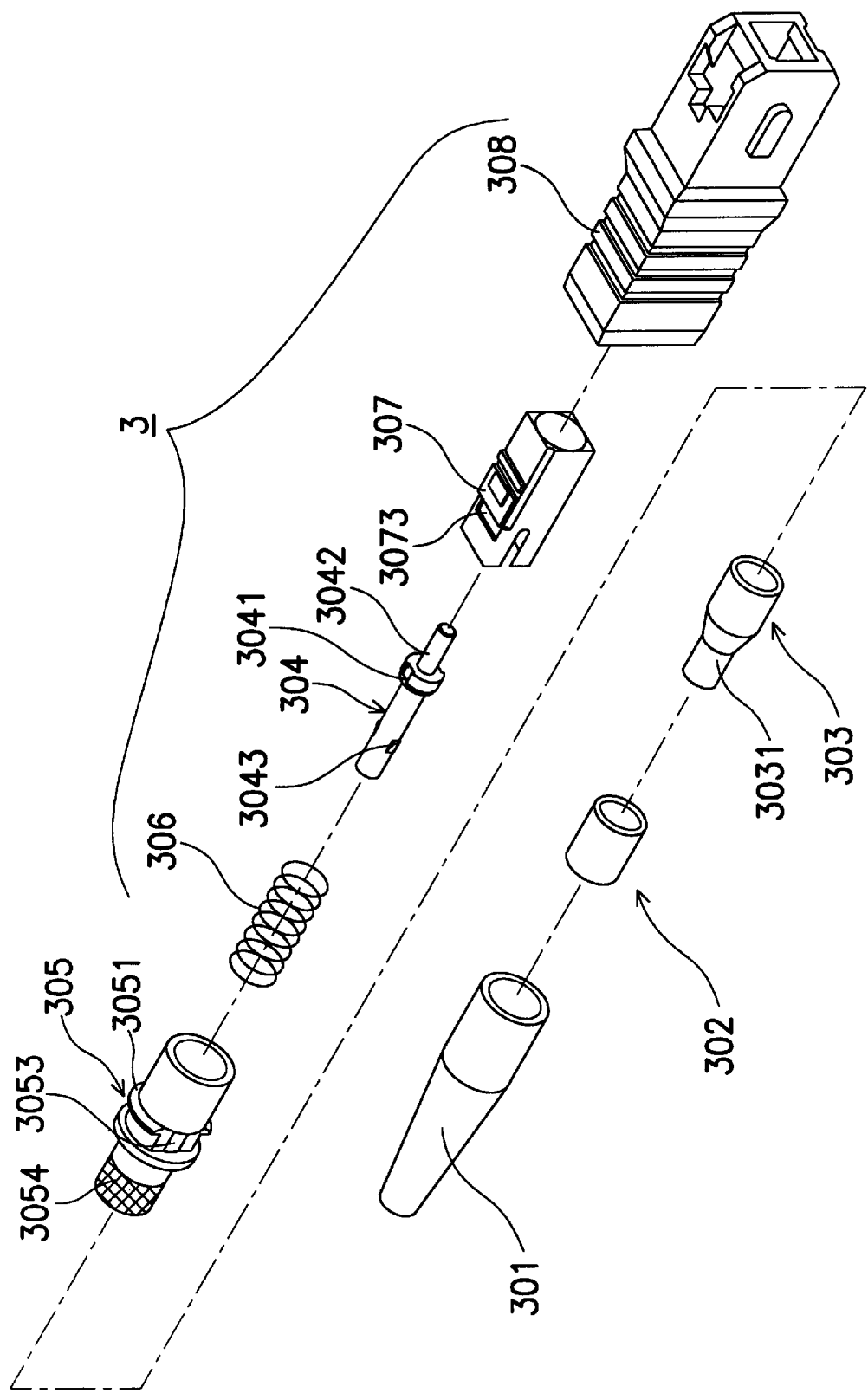
FIG. 1 is an exploded view showing a pre-assembled optical fiber connector according to a first embodiment of the present invention.
Figure 2:
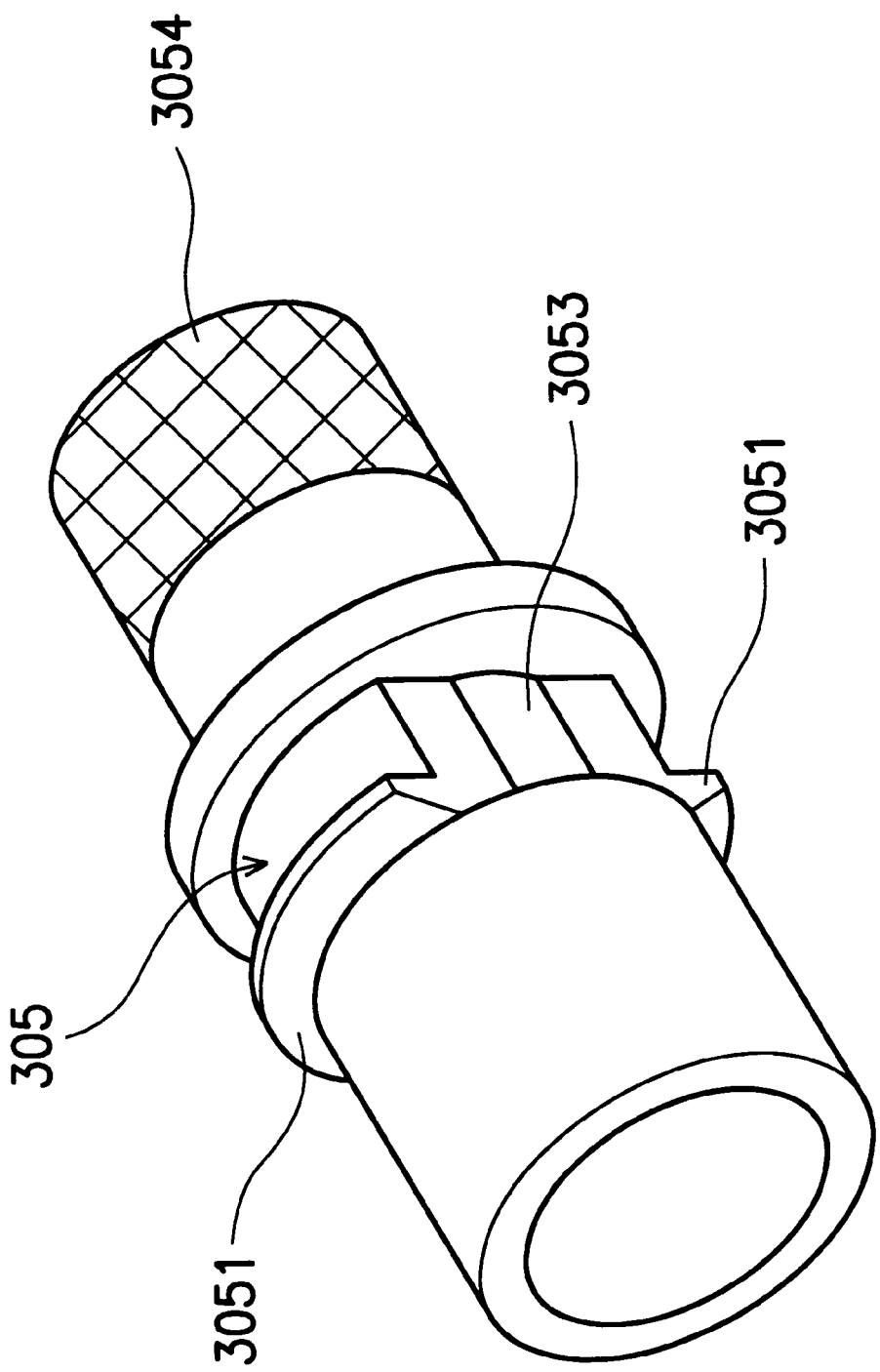
FIG. 2 is a perspective view showing a tubular housing of the pre-assembled optical fiber connector of FIG. 1.

Referring to FIG. 1 and FIG. 2, a pre-assembled optical fiber connector 3 of a first embodiment of the present invention includes: a boot 301, a sleeve 302, a spacing sleeve 303, a tubular housing 305, a spring 306, an alignment ferrule 304, a push-pull insulative housing 307 and a push-pull element 308, wherein the tubular housing 305, the spring 306 and the alignment ferrule 304 can be pre-assembled.

The tubular housing 305 has a pair of flanges 3051 on its circumference, an embossed end 3054, and a pair of apertures 3053 extending in the longitudinal direction and leading to the interior of the tubular housing 305.

The alignment ferrule 304 has a pair of engaging portions 3043 formed on its body, a stop flange 3041, and a ceramic ferrule 3042 protruding from the stop flange 3041.

As mentioned above, the tubular housing 305, the spring 306 and the alignment ferrule 304 can be pre-assembled. In the pre-assembly process, the spring 306 is put around the alignment ferrule 304. Then, the alignment ferrule 304 is inserted into the tubular housing 305 with one end of the spring 306 against the stop flange 3041 and the other end against the interior of the tubular housing 305. Meanwhile, the engaging portions 3043 of the alignment ferrule 304 is pushed into the apertures 3053 of the tubular housing 305. Thus, the tubular housing 305, the spring 306 and the alignment ferrule 304 are pre-assembled together.

The boot 301, the sleeve 302, the spacing sleeve 303, the push-pull insulative housing 307 and the push-pull element 308 of the present invention are the same as those in the conventional art. Therefore, the descriptions thereof are omitted.

Figure 3:
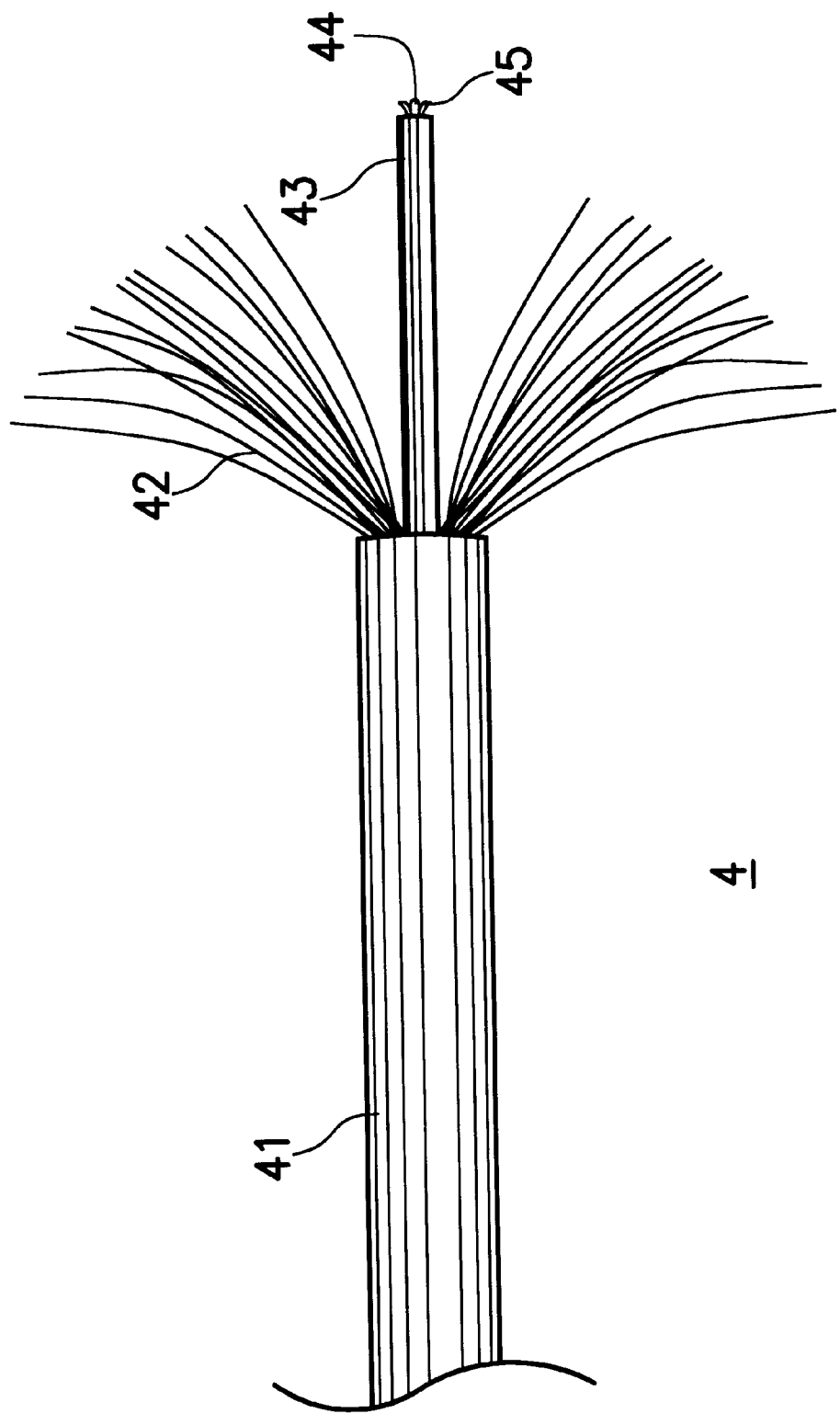
FIG. 3 is a schematic diagram of a peeled optical fiber cable.

Now referring to FIG. 3, an optical fiber cable 4 has a plurality of layers which are, from the outermost to the center, a plastic outer cover 41, celvars 42, a resin layer 43, a transparent shell 45 and an optical fiber 44, respectively.

The steps of assembling the optical fiber cable 4 and the major elements of the optical fiber connector 3 for grinding are described as follows:

peeling the optical fiber cable 4 to expose its various layers;

leading the optical fiber cable 4 to go through the boot 301, the sleeve 302 and the spacing sleeve 303;

inserting the resin layer 43, which contains the transparent shell 45 and an optical fiber 44, into the alignment ferrule 304, which is already pre-assembled together with the tubular housing 305 and the spring 306, so that the optical fiber 44 protrudes from the ceramic ferrule 3042 a little;

putting the spacing sleeve 303 around the embossed end 3054 of the tubular housing 305 that is covered by the celvar 42, so that the celvar 42 is clamped between the embossed end 3054 and the spacing sleeve 303; and spreading the peeled plastic outer cover 41 to cover the narrow end 3031 of the spacing sleeve 303, and then putting the sleeve 302 around the narrow end 3031 so that the plastic outer cover 41 is tightly clamped between the narrow end 3031 and the sleeve 302.

Then, the ceramic ferrule 3042 is ground. The pre-assembled elements of the present invention do not include the push-pull insulative housing 307. Therefore, the ceramic ferrule 3042 rather than the push-pull insulative housing 307 is clamped for grinding. There is no need to use a specialized clamping apparatus. Furthermore, in the grinding process, the ceramic ferrule 3042 can be kept straight without slanting because the ceramic ferrule 3042 is directly clamped by a clamping apparatus. Thus, the grinding results of the present invention are much better than those of the prior art. Furthermore, the tubular housing 305, the spring 306 and the alignment ferrule 304 are pre-assembled so that the assembly process and element storage of the optical fiber connector can be simplified.

The optical fiber connector 3 is completely assembled after the ceramic ferrule 3042 is ground as follows:

putting the boot 301 around the sleeve 302;

pushing the flanges 3051 of the tubular housing 305 into the apertures 3073 of the push-pull insulative housing 307;

inserting the whole-assembled elements into the push-pull element 308 to form a completed optical fiber connector.

Figure 4:
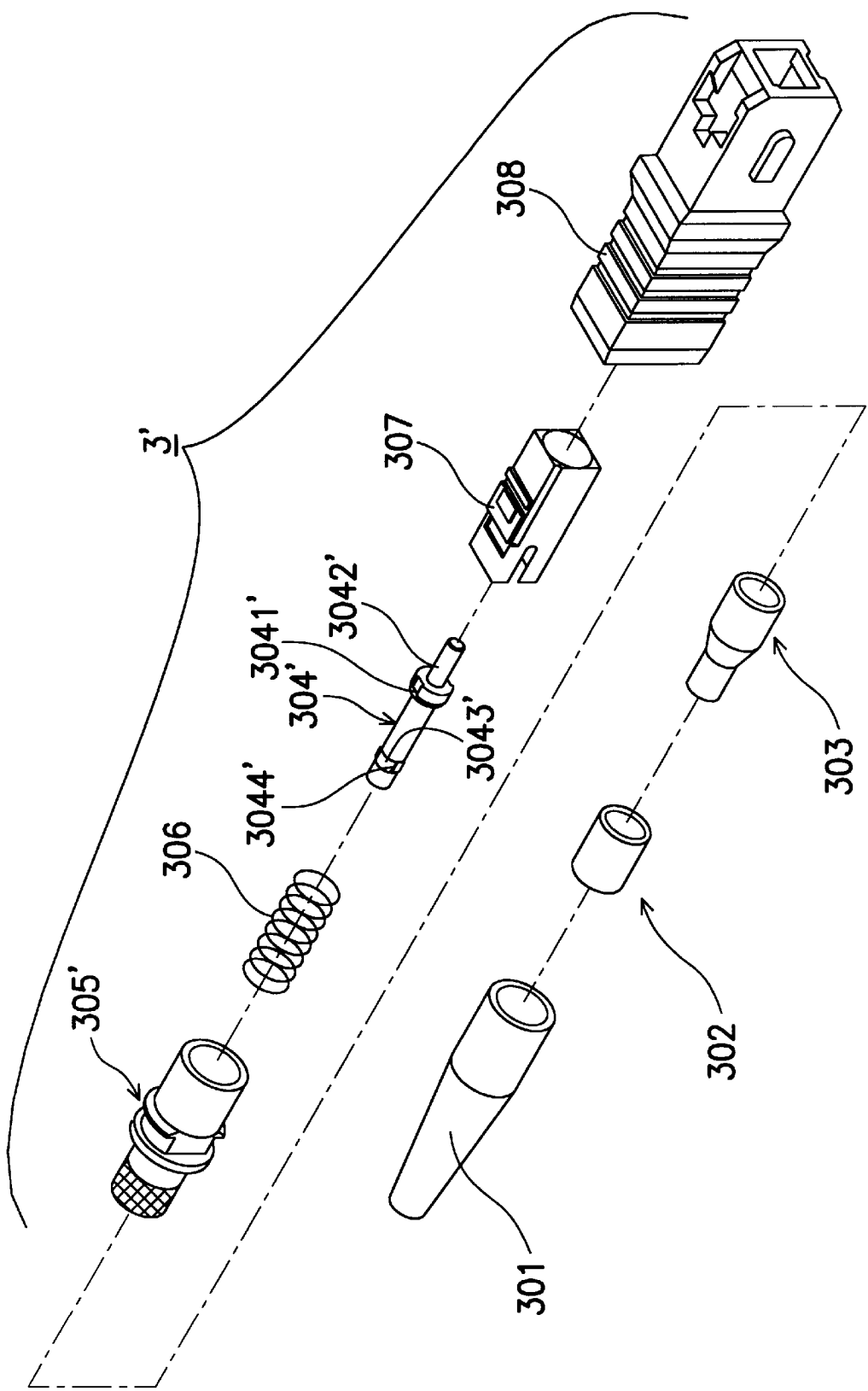
FIG. 4 is an exploded view of a pre-assembled optical fiber connector according to a second embodiment of the present invention.

FIG. 4 is an exploded perspective diagram of a pre-assembled optical fiber connector according to a second embodiment of the present invention, in which elements the same as those in the first embodiment are indicated by the same reference numbers. The optical fiber connector 3' of the second embodiment includes a boot 301, a sleeve 302, a spacing sleeve 303, a tubular housing 305', a spring 306, an alignment ferrule 304', a push-pull insulative housing 307 and a push-pull element 308, wherein the tubular housing 305', the spring 306 and the alignment ferrule 304' can be pre-assembled.

Figure 5A:
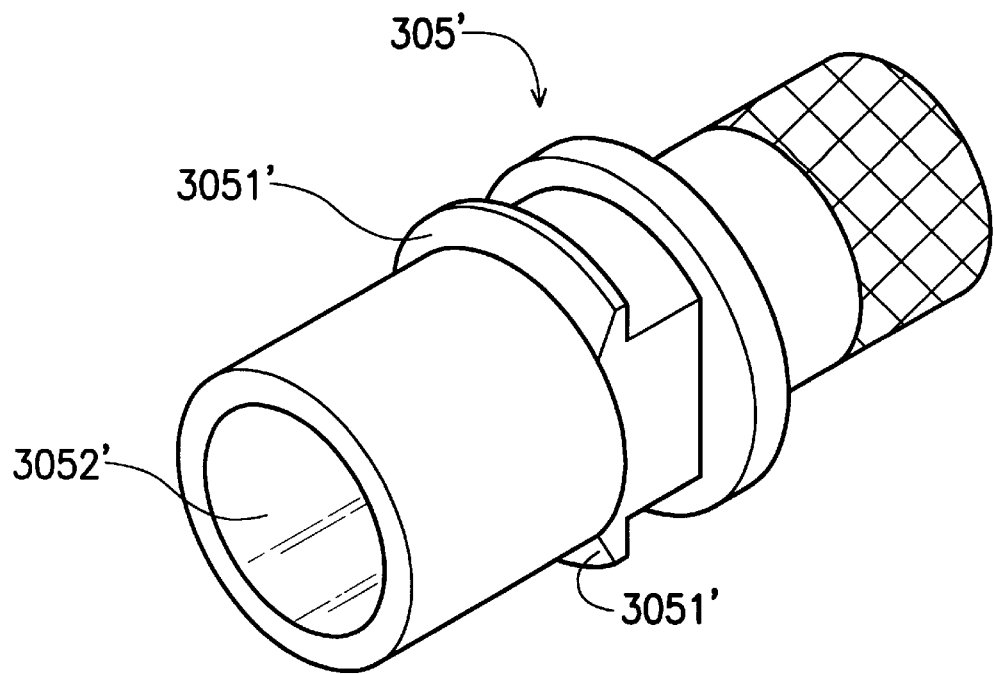
FIG. 5A is a perspective view showing a tubular housing of the pre-assembled optical fiber connector of FIG. 4.
Figure 5B:
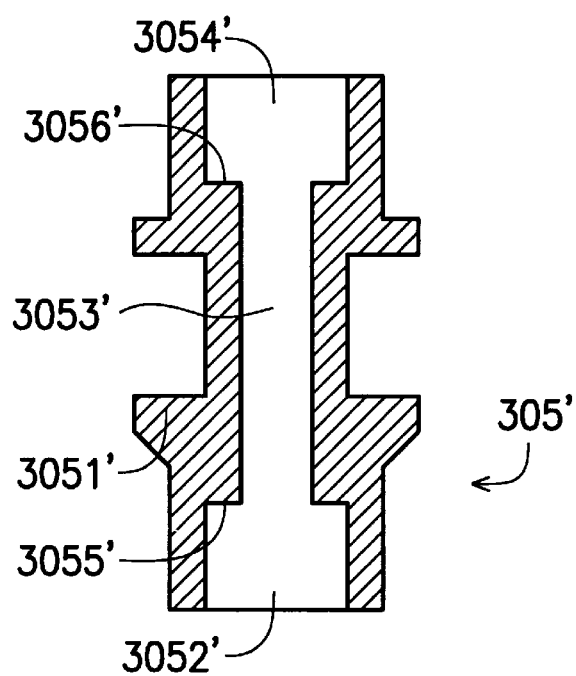
FIG. 5B is a sectional view of FIG. 5A.
Figure 6:
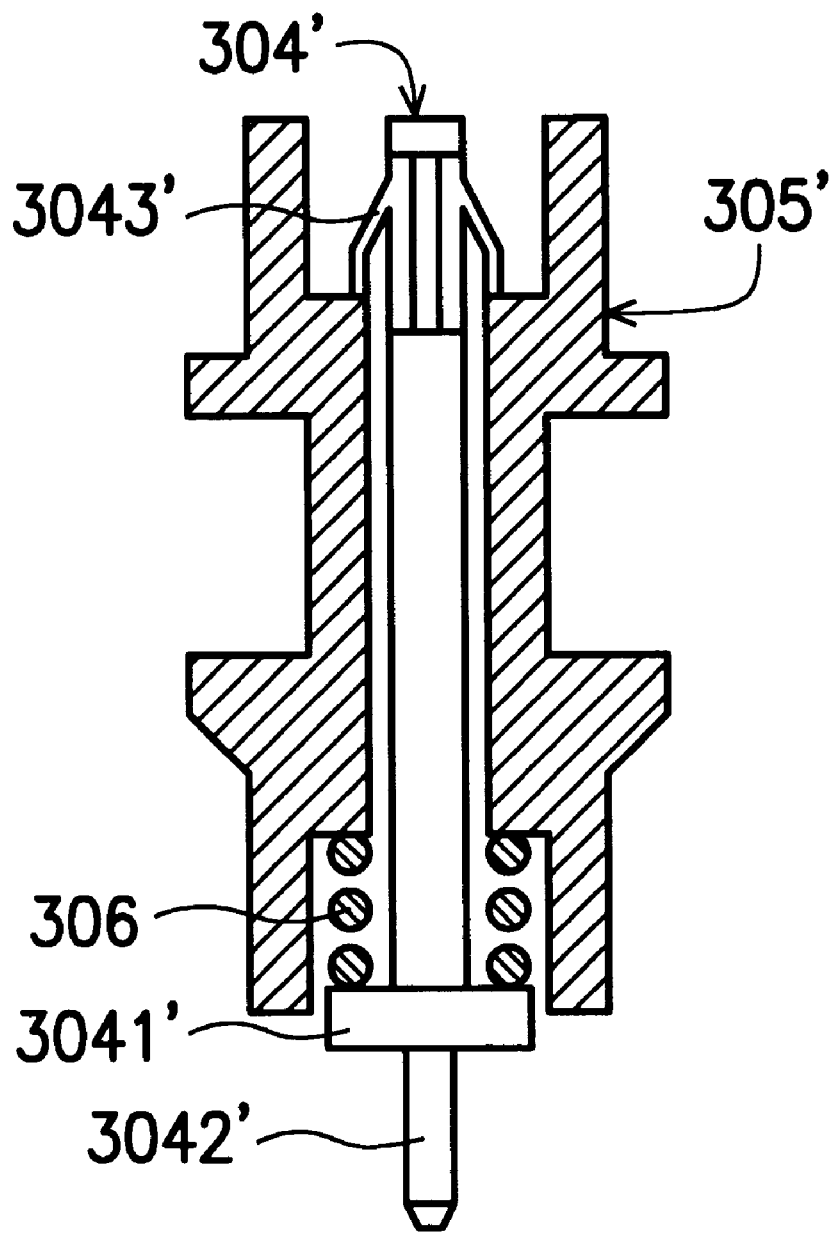
FIG. 6 is a sectional view of the pre-assembled tubular housing, spring and alignment ferrule according to the second embodiment of the present invention.

Referring to FIGS. 5A and 5B, the tubular housing 305' has a pair of flanges 3051' on its circumference, and three communicating holes formed in the interior of the tubular housing 305', which are a first hole 3052', a second hole 3053' and a third hole 3054', respectively. The inner diameter of the second hole 3053' is smaller than those of the first and third holes 3052', 3054'. Thus, a first interface 3055' is formed between the first and second holes 3052' and 3053', while a second interface 3056' is formed between the second and third holes 3053' and 3054'.

Referring back to FIG. 4, the alignment ferrule 304' is substantially cylindrical with a groove circumferentially formed thereon. A metal ring 3043' is put in the groove to clamp the alignment ferrule 304'. Also, a pair of resilient engaging portions 3044' protrude from the metal ring 3043'. When being squeezed, the resilient engaging portions 3044' can be bent in the radial direction of the alignment ferrule 304'. The alignment ferrule 304' further has a stop flange 3041', and a ceramic ferrule 3042' protruding from the stop flange 3041'.

As mentioned above, the tubular housing 305', the spring 306 and the alignment ferrule 304' can be pre-assembled. In the pre-assembly process, the spring 306 is put around the alignment ferrule 304'. Then, the alignment ferrule 304' is inserted into the tubular housing 305' with one end of the spring 306 against the stop flange 3041' and the other end against the first interface 3055' of the tubular housing 305, and meanwhile the resilient engaging portions 3044' of the alignment ferrule 304' is pushed into the third hole 3054' of the tubular housing 305' to engage the second interface 3056' as shown in FIG. 5. Thus, the tubular housing 305', the spring 306 and the alignment ferrule 304' are pre-assembled together.

When inserting the alignment ferrule 304' into the tubular housing 305', the resilient engaging portions 3044' of the alignment ferrule 304' go through the first and second holes 3052', 3053' and then into the third hole 3054'. The second hole 3053' has the smallest inner diameter among the three holes of the tubular housing 305'. While going into the second hole 3053', the resilient engaging portions 3044' are squeezed and bent in the radial direction of the alignment ferrule 304'. Then, the alignment ferrule 304' is pushed into the third hole 3054' through the second hole 3053'. Once the engaging portions 3044' go into the third hole 3054', the engaging portions 3044' are released to engage the second interface 3056'.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pre-assembled optical fiber connector comprising a boot, a sleeve, a spacing sleeve, a tubular housing, a spring, an alignment ferrule, a push-pull insulative housing and a push-pull element which are assembled in series, characterized in that the alignment ferrule has at least one resilient engaging portion to engage the tubular housing so that the tubular housing, the spring and the alignment ferrule are pre-assembled.

2. A pre-assembled optical fiber connector as claimed in claim 1, wherein the alignment ferrule further has a ring from which the resilient engaging portion protrudes.

3. A pre-assembled optical fiber connector as claimed in claim 2, wherein the alignment ferrule is substantially cylindrical, and the resilient engaging portion is bent in the radial direction of the alignment ferrule when the resilient engaging portion is squeezed.

4. A pre-assembled optical fiber connector as claimed in claim 3, wherein the alignment ferrule further has a circumferential groove in which the ring is disposed.

5. A pre-assembled optical fiber connector as claimed in claim 1, wherein the alignment ferrule further has a stop flange; the tubular housing has communicating first, second and third holes inside; the inner diameter of the second hole is smaller than the inner diameters of the first and third holes so that a first interface is formed between the first and second holes, while a second interface is formed between the second and third holes; the spring is compressed between the stop flange and the first interface, while the resilient engaging portion of the alignment ferrule engages the second interface between the second and third holes.

* * * * *